United States Patent
Burgett et al.

(10) Patent No.: US 8,985,137 B2
(45) Date of Patent: Mar. 24, 2015

(54) MOUNTING ASSEMBLIES FOR USE WITH FLUID CONTROL DEVICES

(71) Applicant: Tescom Corporation, Elk River, MN (US)

(72) Inventors: Eric Jacob Burgett, Maple Grove, MN (US); Brian J. Tutt, Brainerd, MN (US); Todd William Larsen, Milaca, MN (US)

(73) Assignee: Tescom Corporation, Elk River, MN (US)

( * ) Notice: Subject to any disclaimer, the term of this patent is extended or adjusted under 35 U.S.C. 154(b) by 158 days.

(21) Appl. No.: 13/632,744

(22) Filed: Oct. 1, 2012

(65) Prior Publication Data

US 2013/0168587 A1 Jul. 4, 2013

Related U.S. Application Data

(60) Provisional application No. 61/581,386, filed on Dec. 29, 2011.

(51) Int. Cl.
*F16K 1/00* (2006.01)
*F16K 27/02* (2006.01)
*F16K 31/122* (2006.01)

(52) U.S. Cl.
CPC ......... *F16K 27/0281* (2013.01); *F16K 31/1221* (2013.01)
USPC .................. 137/315.28; 137/270; 137/315.27; 251/63.4; 251/63.6; 251/291

(58) Field of Classification Search
USPC ..................... 137/15.23, 270, 315.27, 315.28; 251/63.4–63.6, 82, 83, 120, 291
See application file for complete search history.

(56) References Cited

U.S. PATENT DOCUMENTS

| | | | | |
|---|---|---|---|---|
| 2,754,840 | A | * | 7/1956 | Hicks, Jr. .................. 137/454.6 |
| 3,295,079 | A | | 12/1966 | Brown |
| 3,789,875 | A | * | 2/1974 | McGee ......................... 137/553 |
| 4,129,283 | A | * | 12/1978 | Taylor ............................ 251/62 |
| 4,135,546 | A | * | 1/1979 | Morrison ................. 137/315.28 |
| 4,633,896 | A | * | 1/1987 | Bainbridge et al. .......... 137/296 |
| 4,683,453 | A | | 7/1987 | Vollmer et al. |
| 4,712,576 | A | * | 12/1987 | Ariizumi et al. .............. 137/270 |
| 4,925,154 | A | * | 5/1990 | Baker ............................. 251/58 |
| 6,041,804 | A | * | 3/2000 | Chatufale ................... 137/15.23 |
| 6,050,541 | A | * | 4/2000 | Chatufale .................... 251/63.6 |
| 6,192,912 | B1 | | 2/2001 | Butler et al. |
| 8,079,381 | B2 | * | 12/2011 | Fischer et al. ................ 137/359 |
| 8,322,364 | B2 | * | 12/2012 | Lacasse et al. ............... 137/270 |

(Continued)

OTHER PUBLICATIONS

International Searching Authority, "Search Report," issued in connection with International Patent Application No. PCT/US2012/070826, mailed on Apr. 22, 2013, 3 pages.

(Continued)

*Primary Examiner* — Matthew W Jellett
(74) *Attorney, Agent, or Firm* — Hanley, Flight & Zimmerman, LLC (57) ABSTRACT

Mounting assemblies for use with fluid control devices are disclosed. An example apparatus includes a bonnet to be coupled to a valve and a mounting assembly including a first side to be coupled to an actuator and a second side to be rotatably coupled at an end of the bonnet to enable a rotational position of the mounting assembly to change relative to the bonnet.

14 Claims, 7 Drawing Sheets

(56) References Cited

U.S. PATENT DOCUMENTS

2002/0030171 A1* 3/2002 Ishigaki et al. ............... 251/291
2009/0038690 A1 2/2009 Zur et al.
2010/0072410 A1* 3/2010 Lacasse et al. ............... 251/324
2013/0168580 A1* 7/2013 Burgett et al. ............... 251/14

OTHER PUBLICATIONS

International Searching Authority, "Written Opinion," issued in connection with International Patent Application No. PCT/US2012/070826, mailed on Apr. 22, 2013, 7 pages.

Omega, "Electronically controlled proportioning valves" retrieved from the internet: <https://www.omega.com/ppt/pptsc.asp?ref=PV14&ttID=PV14&Nav>, last visited May 31, 2013, 2 pages.

Custom Valve Concepts, "W.A kates—flow control valves" retrieved from the internet:< http://www.customvalveconcepts.com/products.php>, last visited May 31, 2013, 1 page.

Hanbay, retrieved from the internet:< http://www.hanbayinc.com/>, last visited may 31, 2013, 1 page.

* cited by examiner

MOUNTING ASSEMBLIES FOR USE WITH FLUID CONTROL DEVICES

RELATED APPLICATION

This patent claims priority to U.S. provisional application No. 61/581,386, filed Dec. 29, 2011, which is hereby incorporated herein by reference in its entirety.

FIELD OF THE DISCLOSURE

This patent relates to mounting assemblies and, more specifically, to mounting assemblies for use with fluid control devices.

BACKGROUND

Process control systems use a variety of field devices to control process parameters. These field devices sometimes include valves and actuators, which may be electrically wired.

SUMMARY

An example apparatus in accordance with the teachings of this disclosure includes a bonnet to be coupled to a valve and a mounting assembly including a first side to be coupled to an actuator and a second side to be rotatably coupled at an end of the bonnet to enable a rotational position of the mounting assembly to change relative to the bonnet.

Another example apparatus in accordance with the teachings of this disclosure includes a valve body comprising an inlet and an outlet, a bonnet coupled to the valve body and a mounting assembly including a first side to be coupled to an actuator and a second side to be rotatably coupled at an end of the bonnet to enable a rotational position of the mounting assembly to change relative to the bonnet.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to example mounting assemblies for use with example valves and associated bonnets that enable pneumatic and/or fluid valves to be operated by an actuator (e.g., a linear actuator, a motorized flow controller) mountable at a plurality of orientations relative to the bonnet. Enabling the actuator to be mountable at a plurality of orientations and, specifically, any position about an axis of the valve (e.g., 360 degrees), enables electrical connections of the actuator to be located in a desired and/or preferred position (e.g., an operator accessible location). Thus, regardless of the position in which the valve is installed in a pipeline, the actuator can be easily electrically wired.

In some examples, an example mounting assembly includes a first plate (e.g., an adapter plate), a second plate and/or a retainer (e.g., a snap ring) that are couplable to an example bonnet. The bonnet includes a cylindrical portion about which the first and/or second plates are rotatably coupled. The first plate includes an aperture that surrounds the cylindrical bonnet portion and is rotatably coupled thereto by a retainer (e.g., a snap ring). The second plate is positioned on and/or adjacent the first plate and defines a non-circular aperture (e.g., a square aperture) through which a correspondingly shaped actuator stem extends. At least a portion of the actuator stem may have a square cross-section or other shape that corresponds to the non-circular aperture.

During operation, the non-circular aperture substantially prevents the actuator from moving relative to the first and/or second plates and, thus, substantially ensures that only vertical forces are imparted on the first and/or second plates from the actuator and/or actuator stem. Fasteners (e.g., bolts) couple the actuator and the first and second plates together. The retainer rotatably couples the plates and the actuator to the bonnet. To substantially prevent vibration from moving the actuator relative to the valve and/or plates, one or more of the fasteners may be a set screw that is driven against and/or onto a surface of the bonnet to provide a friction lock.

Figure 1:
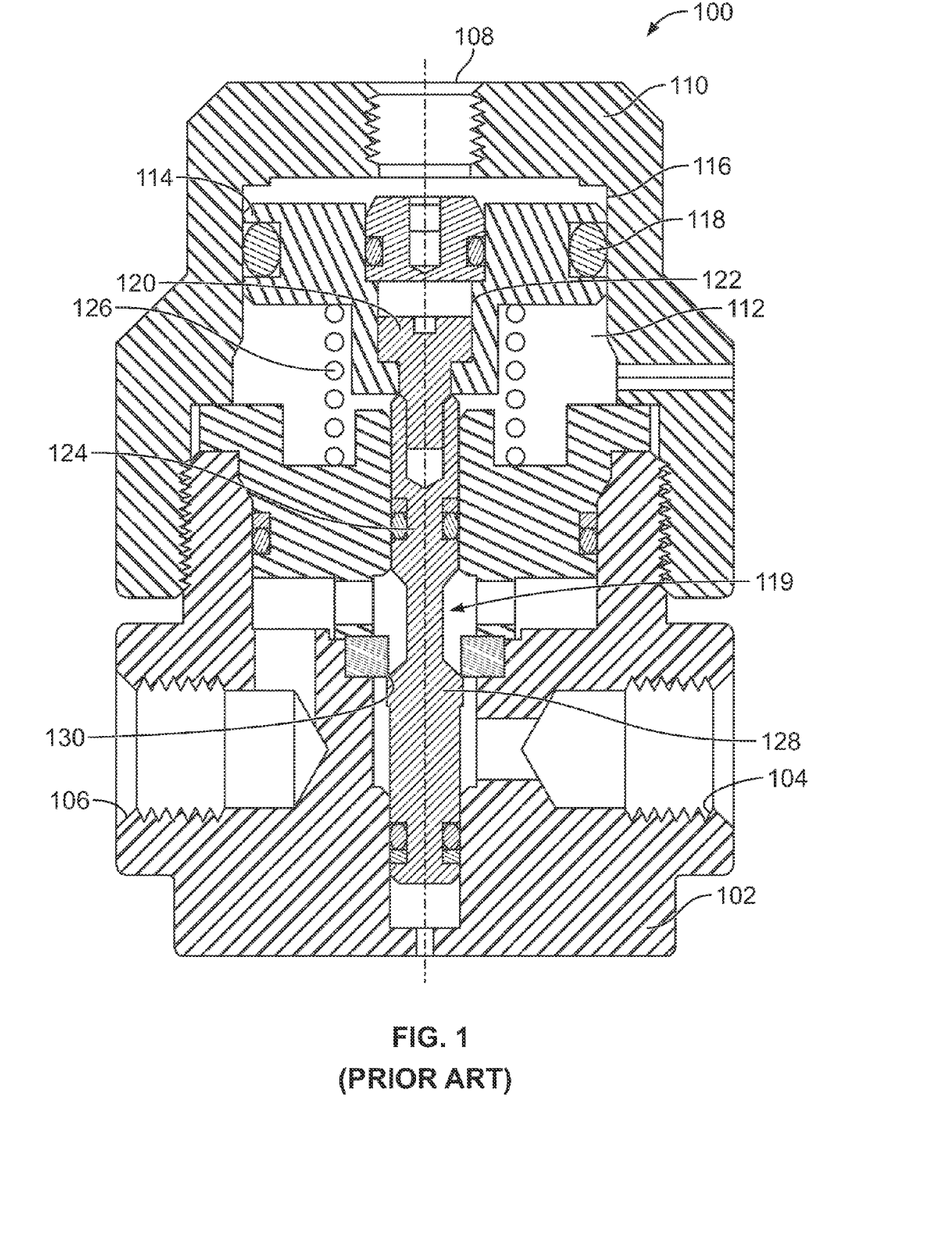
FIG. 1 depicts a known valve.

FIG. 1 depicts a known valve 100 including a body 102 having an inlet 104, an outlet 106 and a pilot or control pressure inlet or input 108. A bonnet 110 is threaded onto the body 102 to form a chamber 112. A piston or sensor 114 is positioned within the chamber 112 and slidably engages an inner surface or passage 116. The piston 114 includes a seal (e.g., an O-ring) 118 that sealingly engages the passage 116 of the chamber 112. The piston 114 is coupled to a valve assembly 119 via a fastener 120. The fastener 120 is received in a recess 122 of the piston 114 and threadingly engages a stem 124 of the valve assembly 119. The coupling between the piston 114 and the stem 124 enables the piston 114 to be moveable relative to the stem 124 to substantially prevent the piston 114 from binding in the passage 116 when moving therein. A spring 126 urges a plug 128 of the valve assembly 119 via the piston 114 to engage a seat 130.

In operation, a desired control pressure is applied to the pilot input 108 and, thus, to the piston 114. If the control pressure applies a force to the piston 114 that is greater than the force exerted on the piston 114 via the spring 126, the piston 114 is displaced toward the seat 130 to drive the plug 128 away from the seat 130 and enable fluid flow between the inlet 104 and the outlet 106. On the other hand, if the control pressure applies a force that is less than the force exerted on the piston 114 via the spring 126, the piston 114 is urged away from the seat 130 to drive the plug 128 toward the seat 130 and prevent fluid flow between the inlet 104 and the outlet 106. The known valve 100 is only moveable to a fully open position or a fully closed position because the control pressure is not variable and/or adjustable to enable the plug 128 to be moved and held (e.g., without oscillations) at any other position (e.g., a 30% open position). Instead, increasing the pressure (e.g., the introduction of a quick burst of air) in the chamber 112 causes the valve 100 to quickly move to a fully open position and decreasing the pressure in the chamber 112 causes the valve 100 to quickly move to the fully closed position.

Figure 2:
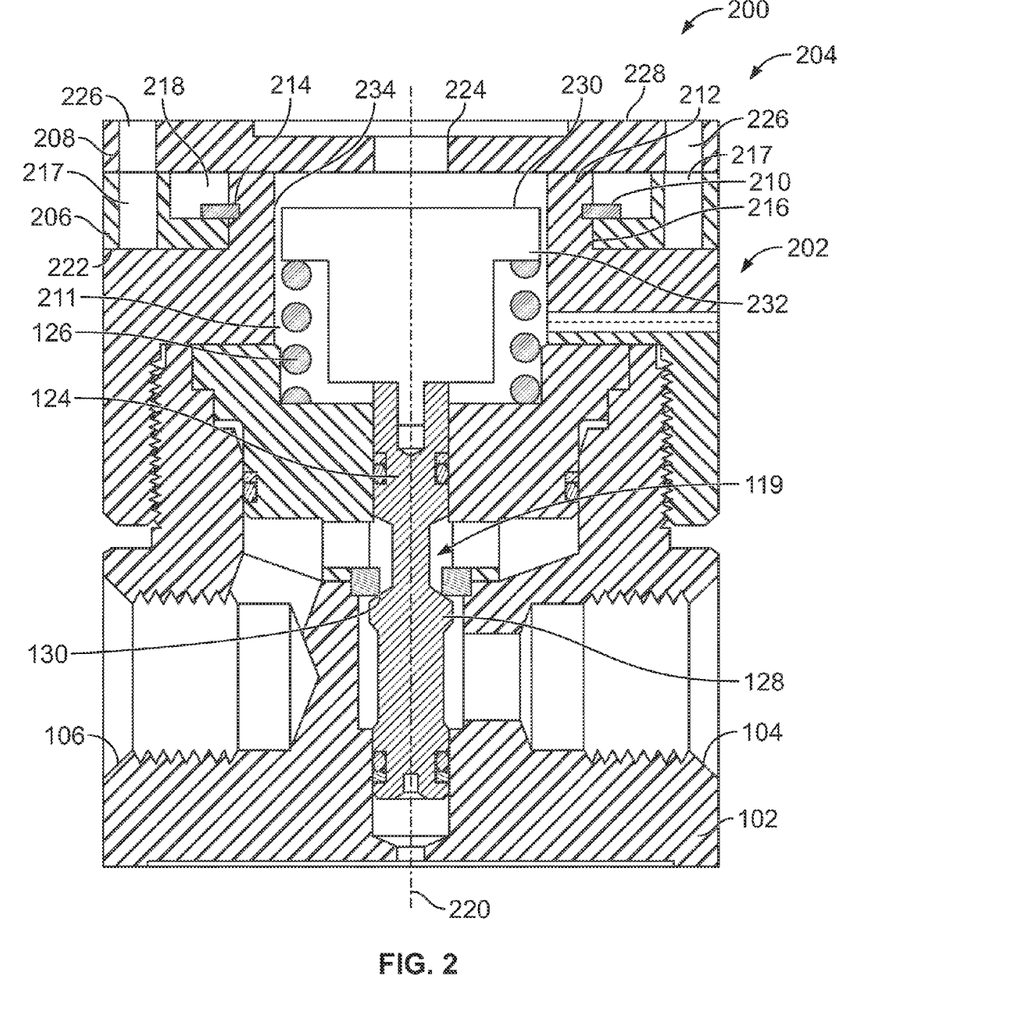
FIGS. 2 and 3 depict different views of an example valve including an example mounting assembly in accordance with the teachings of this disclosure.

FIG. 2 depicts an example valve 200 including an example bonnet 202 and an example mounting assembly 204. The mounting assembly 204 includes a first plate 206, a second plate 208 and a retainer (e.g., a snap ring) 210. The bonnet 202 is threaded onto the body 102 to define a chamber 211. The bonnet 202 includes an elongated and/or cylindrical portion 212 defining a groove 214 that receives and/or retains the retainer 210.

In this example, the first plate 206 defines a first aperture 216, second apertures (e.g., threaded apertures) 217 and a groove 218. The first aperture 216 surrounds the cylindrical portion 212. The groove 218 enables the retainer 210 to be received by the groove 214 of the bonnet 202 to rotatably couple the first plate 206 to the bonnet 202. An interaction and/or engagement between the retainer 210 and the first plate 206 enables the first plate 206 to rotate about an axis 220 and substantially prevents the first plate 206 from moving away from a surface (e.g., a flat surface, an annular surface) 222 of the bonnet 202.

In this example, the second plate 208 defines a third aperture (e.g., non-circular aperture, a circular aperture) 224 and fourth apertures (e.g., threaded and/or non-threaded apertures) 226. The third aperture 224 is to receive an actuator stem (not shown) and may have a shape that is similar to and/or corresponds to a cross-section of the actuator stem received therein.

An actuator or motor (not shown) having mounting holes may be positioned adjacent a surface 228 of the second plate 208 such that the mounting holes and the apertures 217 and 226 align and the actuator stem extends through the third aperture 224 and engages a surface 230 of a member, spring keeper or piston 232. In this example, the piston 232 is threadably coupled directly to the stem 124 and does not sealingly and/or slidably engage an inner surface 234 of the chamber 211. To enable the piston 232 to be coupled to the stem 124 via a tool (e.g., a wrench), in some examples, the piston 232 may have one or more flat edges.

Fasteners may be positioned through the mounting holes and the apertures 217 and 226 to couple the actuator to the plates 206 and 208. While the actuator is coupled to the plates 206 and 208, because of the rotational coupling between the first plate 206 and the bonnet 202, the actuator and the plates 206 and 208 can rotate about the axis 220. Thus, regardless of the position that the valve 200 is installed in a pipeline, the actuator can be moved to enable easy electrical wiring. Once the actuator is in the desired location relative to the bonnet 202, one or more of the fasteners (e.g., a set screw) may be driven through the aperture(s) 217 against the surface 222 to substantially prevent movement of the actuator and the plates 206 and/or 208 relative to the bonnet 202.

In operation, the actuator moves the piston 232 via the actuator stem (not shown). Moving the piston 232 toward the seat 130 drives the plug 128 away from the seat 130 and enables fluid flow between the inlet 104 and the outlet 106. Moving the piston 232 away from the seat 130, via the spring 126 and/or retraction of the actuator stem, drives the plug 128 toward the seat 130 and substantially prevents fluid flow between the inlet 104 and the outlet 106. While the above example describes moving the plug 128 to the open position and the closed position, the examples disclosed herein enable the plug to be moved and retained in any position (e.g., 30% open position, etc.) without substantial oscillation.

Figure 3:
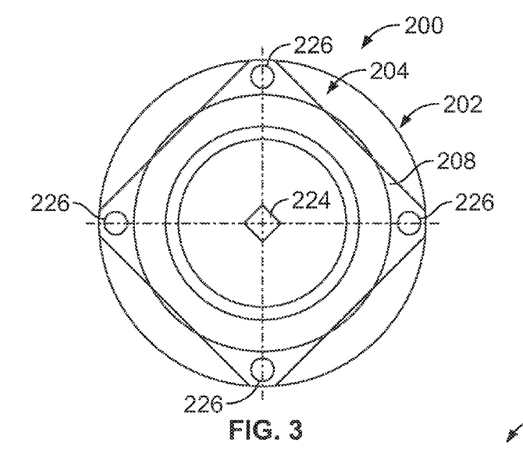

FIG. 3 depicts a top view of the mounting assembly 204 and the bonnet 202. While the third aperture 224 (e.g., the aperture that receives the actuator stem) is depicted as having a square shape, the third aperture 224 may be any other shape (e.g., a circular, a rectangular, a triangular, etc.). While the second plate 208 is depicted as having a square shape, the first and/or second plates 206 and/or 208 may have any other shape (e.g., a circular shape, etc.).

Figure 4:
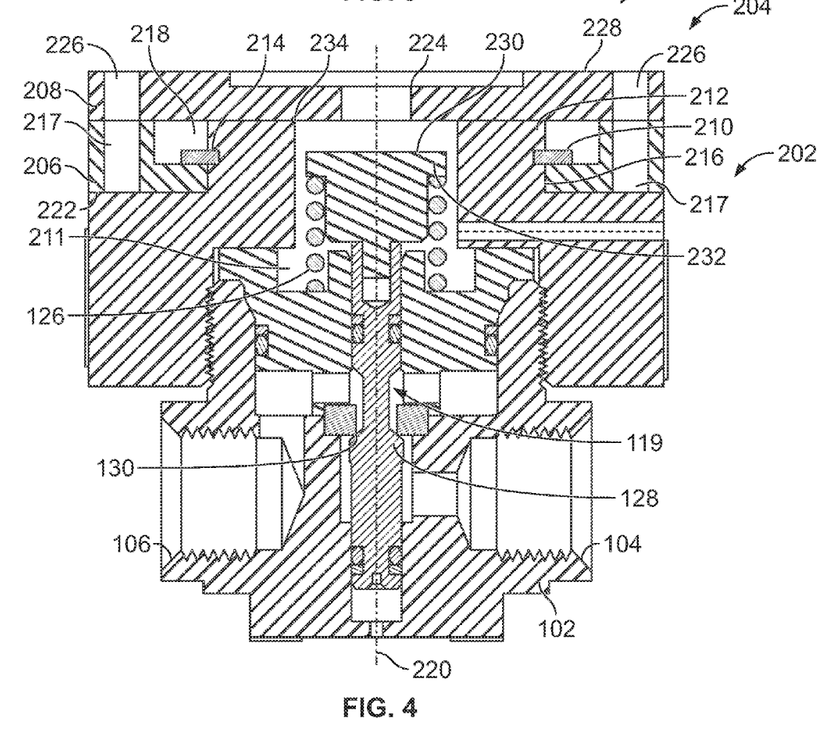
FIGS. 4 and 5 depict different views of another example valve including an example mounting assembly in accordance with the teachings of this disclosure.
Figure 5:
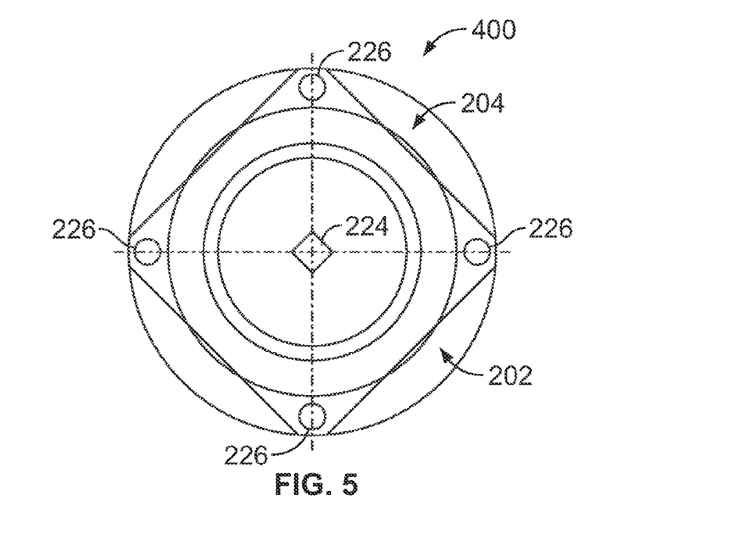

FIGS. 4 and 5 depict an example valve 400 that functions the same as the valve 200. However, the relative sizing of some of the components (e.g., the body 102) is different.

Figure 6:
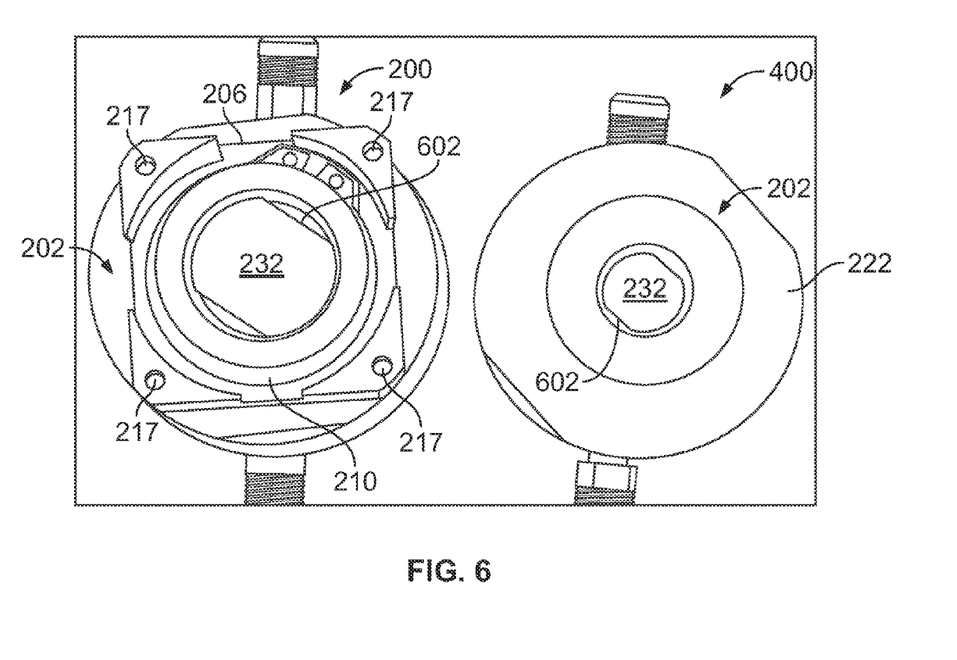
FIGS. 6-12 depict different views of assembling the example valves including the example mounting assemblies in accordance with the teachings of this disclosure.
Figure 7:
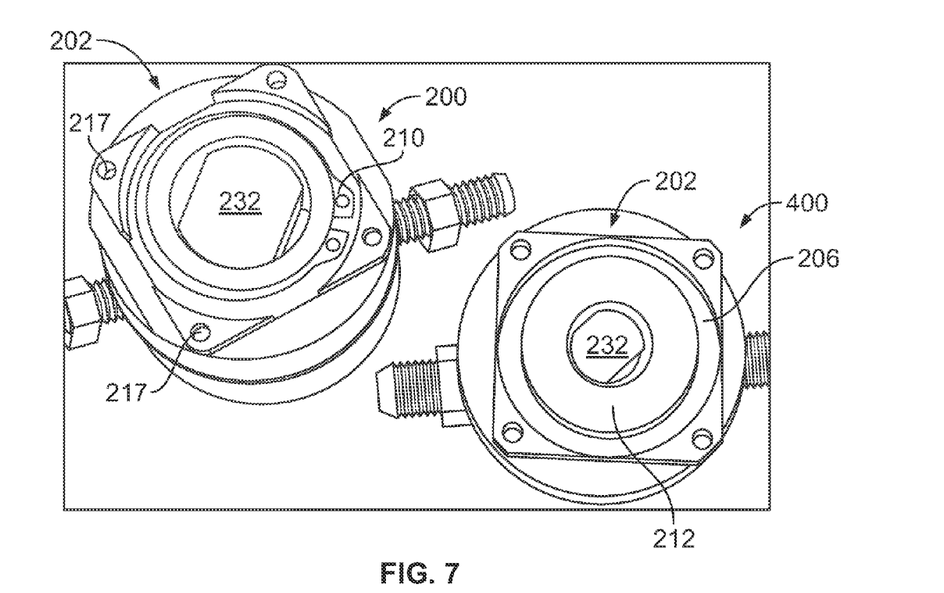
Figure 8:
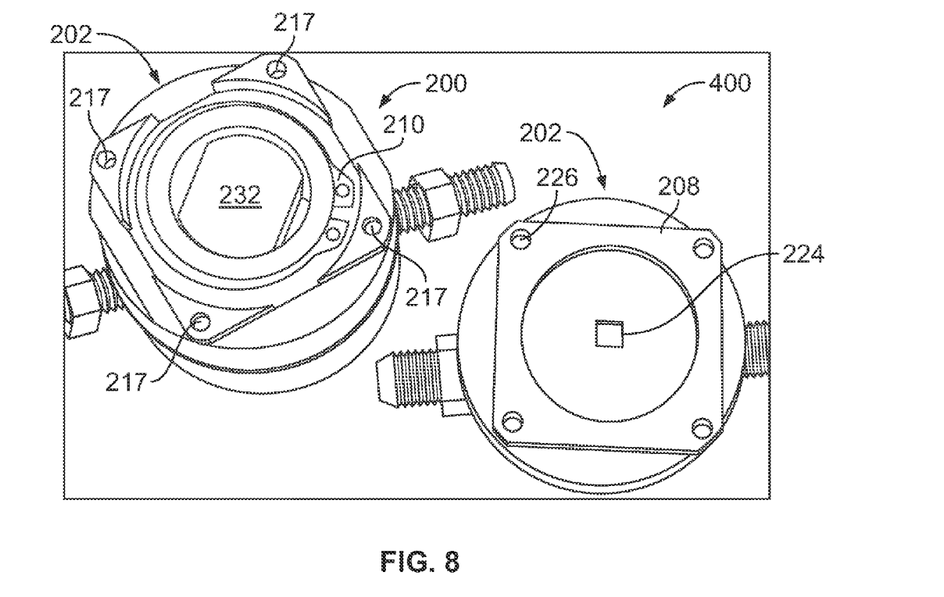
Figure 9:
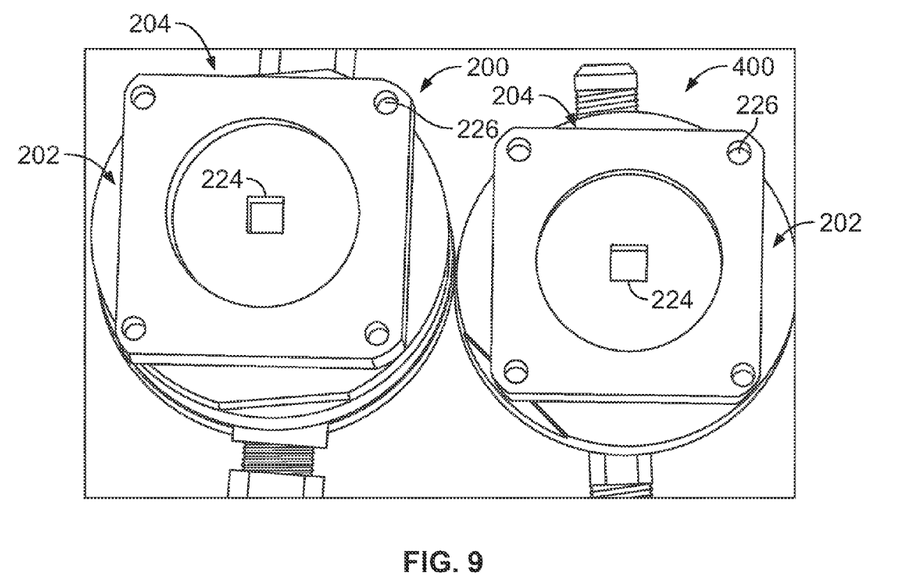
Figure 10:
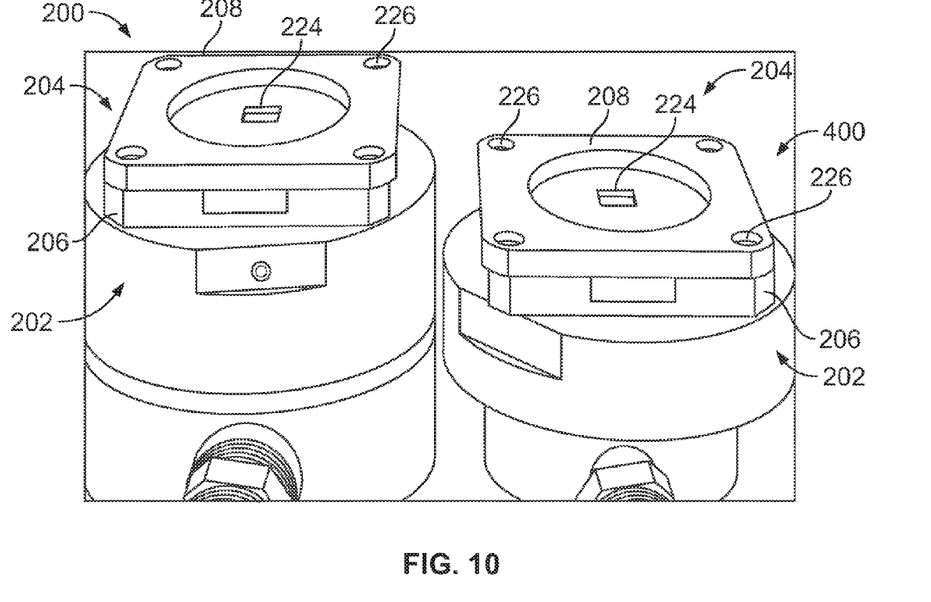
Figure 11:
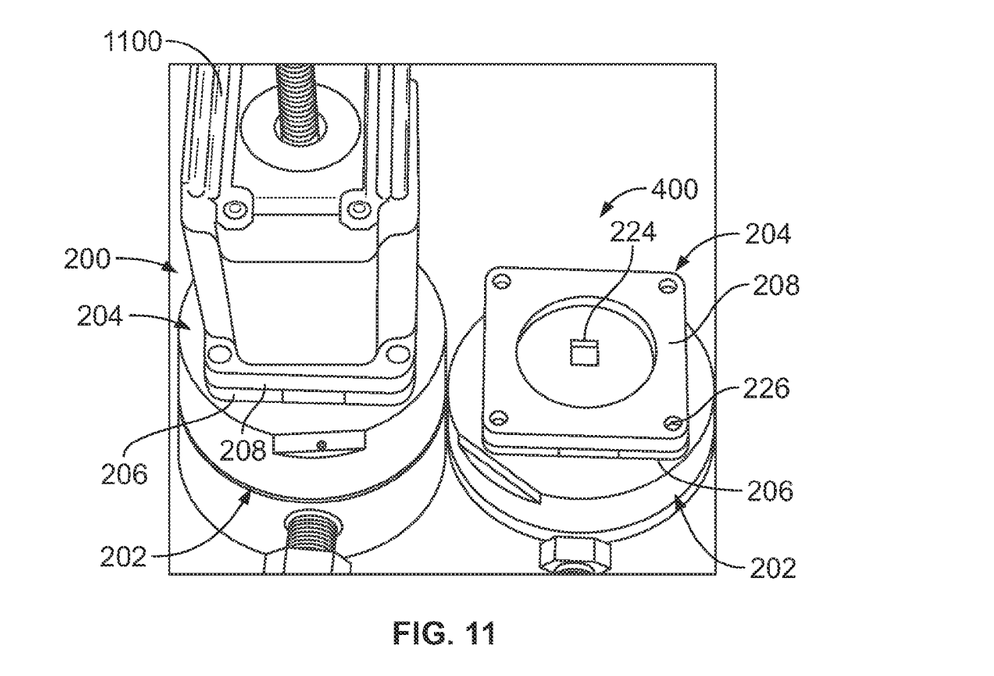
Figure 12:
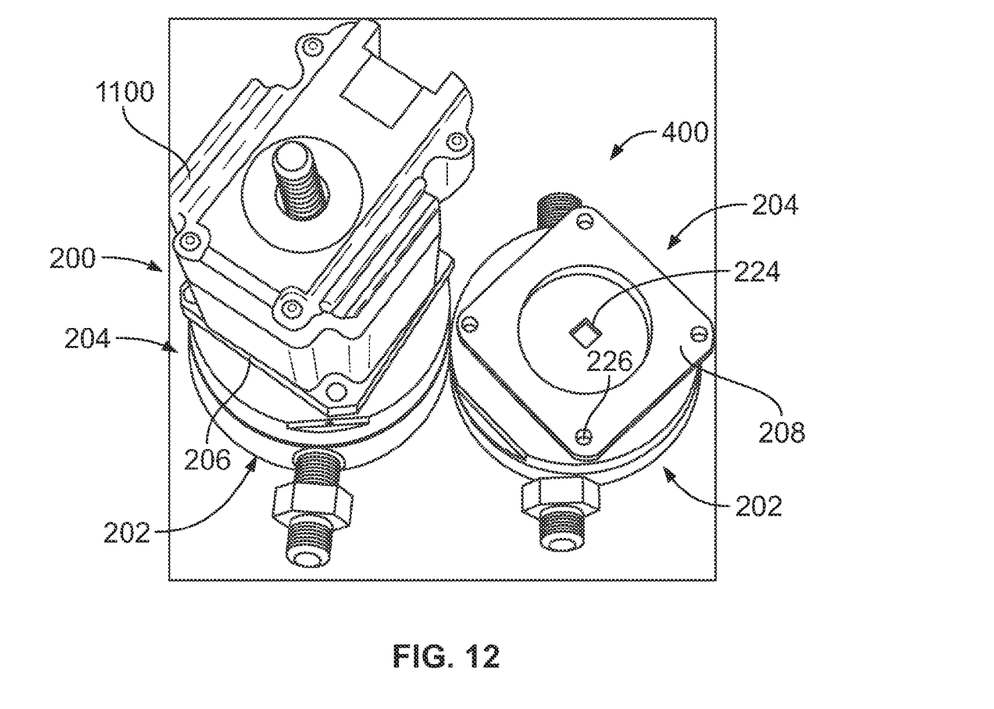

FIGS. 6-12 depict the process of assembling the valves 200 and/or 400. FIG. 6 depicts the valves 200 and 400. The valve 200 includes the first plate 206 rotatably coupled to the bonnet 202 via the retainer 210. The valve 400 does not have the first plate 206 coupled thereto. In this example, to enable the piston 232 to be coupled to the stem 124 via a tool (e.g., a wrench), the piston 232 has flat peripheral edges 602. FIG. 7 depicts the valve 400 with the first plate 206 positioned about the cylindrical portion 212. FIG. 8 depicts the second plate 208 positioned on the valve 400. FIGS. 9 and 10 depict different views of the valves 200 and 400 with the mounting assemblies 204 installed thereon. FIGS. 11 and 12 depict different views of an actuator or motor 1100 positioned on the mounting assembly 204 of the valve 200.

The examples disclosed herein relate to valves having a mounting assembly and/or bracket rotatably coupled to a bonnet to enable the rotational coupling of an actuator and/or motor. The actuator may be a linear actuator or any any other device to position the valve plug at any position between 0% and 100% open.

In some examples, the actuator and/or motor is rotatably coupled (e.g., operably rotatably coupled) to the bonnet via a retaining ring. Specifically, the actuator and/or motor is coupled to a plate of the mounting assembly that is rotatably coupled to the bonnet via the retaining ring. The actuator and/or motor is coupled to the mounting assembly via a plurality of fasteners that extend through mounting holes and/or apertures.

In some examples, the example mounting assembly includes a plate having a square aperture that receives an actuator stem having a similar and/or corresponding cross-section. The interaction between the square aperture and the actuator stem substantially ensures that any rotational movement of the actuator (e.g., during actuation) does not cause movement between the actuator, the mounting assembly and/or or the valve.

As set forth herein, an example apparatus includes a bonnet to be coupled to a valve and a mounting assembly including a first side to be coupled to an actuator and a second side to be rotatably coupled at an end of the bonnet to enable a rotational position of the mounting assembly to change relative to the bonnet. In some examples, the mounting assembly includes a retainer, a first plate, and a second plate. The first plate is to be coupled to the second plate. The retainer is to rotatably couple the first plate to the bonnet.

In some examples, the second plate is coupled to the first plate via fasteners. In some examples, at least one of the fasteners includes an end to drive against a face of the bonnet to fix the position of the first plate and the second plate relative to the bonnet. In some examples, the bonnet includes an elongated portion defining a groove to receive the retainer. In some examples, the first plate includes an aperture to surround the elongated portion. In some examples, the second plate includes an aperture through which a stem of the actuator is to extend. In some examples, the aperture includes a non-circular shape that corresponds to a cross-sectional shape of the stem. The non-circular shape is to substantially prevent non-vertical forces from being imparted on the second plate.

In some examples, a set screw is to extend through the first plate and the second plate and drive against a face of the bonnet to fix the rotational position of the mounting assembly relative to the bonnet. In some examples, the retainer includes a snap-ring.

Another example apparatus includes a valve body including an inlet and an outlet, a bonnet coupled to the valve body and a mounting assembly including a first side to be coupled to an actuator and a second side to be rotatably coupled at an end of the bonnet to enable a rotational position of the mounting assembly to change relative to the bonnet.

In some examples, the example apparatus also includes a flow control member to control fluid flow through a flow aperture defined by the valve body. In some examples, the example apparatus also includes a piston assembly coupled to the flow control member, a stem of the actuator is to interact with the piston assembly to change the position of the flow control member. In some examples, the mounting assembly includes a retainer, a first plate, and a second plate. The first plate is to be coupled to the second plate. The retainer is to rotatably couple the first plate to the bonnet. In some examples, the bonnet includes an elongated portion defining a groove to receive the retainer. In some examples, the first plate includes an aperture to surround the elongated portion. In some examples, the second plate includes an aperture through which a stem of the actuator is to extend. In some examples, the aperture includes a non-circular shape that corresponds to a cross-sectional shape of the stem. The non-circular shape is to substantially prevent non-vertical forces from being imparted on the second plate.

An example apparatus includes a valve body comprising an inlet and an outlet, a bonnet coupled to the valve body and means for mounting an actuator at different rotational positions relative to the valve body. In some examples, the means for mounting the actuator at different rotational positions relative to the valve body includes a retainer, a first plate, and a second plate. The first plate is to be coupled to the second plate. The retainer is to rotatably couple the first plate to the bonnet. In some examples, the bonnet includes an elongated portion defining a groove to receive the retainer, the first plate includes an aperture to surround the elongated portion.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus, comprising:
   a bonnet to be coupled to a valve, the bonnet defining a groove to receive a retainer; and
   a mounting assembly comprising:
      a first plate defining an aperture to receive the bonnet, the retainer to rotatably couple the first plate to the bonnet;
      a second plate having a first surface to face a valve actuator and a second surface to face the first plate, the retainer to be positioned between the first plate and the second plate, prior to fixing the first and second plates relative to the bonnet, the first and second plates being rotatable about an axis of the bonnet to enable a rotational position of the mounting assembly to change relative to the bonnet, the second plate is coupled to the first plate via a fastener having an end that drives against the bonnet to fix the position of the first plate and the second plate relative to the bonnet.

2. The apparatus of claim 1, wherein the bonnet comprises an elongated portion defining the groove to receive the retainer.

3. The apparatus of claim 1, wherein the second plate comprises an aperture through which a stem of the valve actuator is to extend.

4. The apparatus of claim 3, wherein the aperture comprises a non-circular shape that corresponds to a cross-sectional shape of the stem.

5. The apparatus of claim 1, wherein a set screw is to extend through the first plate and the second plate and drive against a face of the bonnet to fix the rotational position of the mounting assembly relative to the bonnet.

6. The apparatus of claim 1, wherein the retainer comprises a snap-ring.

7. An apparatus, comprising:
   a valve body comprising an inlet and an outlet;
   a bonnet coupled to the valve body; and
   a mounting assembly, comprising:
      a first plate defining an aperture to receive the bonnet, the first plate rotatably coupled to the bonnet via a snap-ring;
      a second plate having a first surface to receive a valve actuator and
      a second surface to face the first plate, prior to fixing the first and second plates relative to the bonnet, the first and second plates being rotatable about an axis of the bonnet to enable a rotational position of the mounting assembly to change relative to the bonnet, wherein the mounting assembly is to be disposed between the bonnet and valve actuator.

8. The apparatus of claim 7, further comprising a flow control member to control fluid flow through a flow aperture defined by the valve body.

9. The apparatus of claim 8, further comprising a piston assembly coupled to the flow control member, a stem of the valve actuator to interact with the piston assembly to change the position of the flow control member.

10. The apparatus of claim 7, wherein the bonnet comprises an elongated portion defining a groove to receive the snap-ring.

11. The apparatus of claim 7, wherein the second plate comprises an aperture through which a stem of the valve actuator is to extend.

12. The apparatus of claim 11, wherein the aperture comprises a non-circular shape that corresponds to a cross-sectional shape of the stem.

13. An apparatus, comprising:
   a first plate having a first aperture to receive a portion of a valve bonnet and a second aperture radially spaced from the first aperture;
   a second plate having a first surface to receive a valve actuator, a second surface opposite the first surface to face the first plate, a third aperture to receive a stem of the valve actuator and a fourth aperture, wherein the first and second plates are rotatable relative to the bonnet before a fastener is disposed in the second aperture and the fourth aperture and the first and second plates are fixed relative to the bonnet when the fastener is disposed in the second aperture and the fourth aperture and the fastener drives against the bonnet, wherein the first aperture defines a first portion having a first diameter and a second portion having a second diameter.

14. The apparatus of claim 13, wherein in the third aperture comprises a non-circular shape.

* * * * *